(12) United States Patent
Ichihashi

(10) Patent No.: US 7,580,099 B2
(45) Date of Patent: Aug. 25, 2009

(54) LIQUID CRYSTAL DISPLAY DEVICE

(75) Inventor: Mitsuyoshi Ichihashi, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 180 days.

(21) Appl. No.: 11/579,335

(22) PCT Filed: May 6, 2005

(86) PCT No.: PCT/JP2005/008732

§ 371 (c)(1), (2), (4) Date: Sep. 20, 2007

(87) PCT Pub. No.: WO2005/109088

PCT Pub. Date: Nov. 17, 2005

(65) Prior Publication Data

US 2008/0024703 A1    Jan. 31, 2008

(30) Foreign Application Priority Data

May 7, 2004    (JP)    ............................. 2004-138599

(51) Int. Cl.
G02F 1/1335    (2006.01)

(52) U.S. Cl. ...................................... 349/119; 349/117
(58) Field of Classification Search ........................ None
See application file for complete search history.

(56) References Cited

U.S. PATENT DOCUMENTS

2009/0021671 A1* 1/2009 Fukagawa et al. ............. 349/96
2009/0033839 A1* 2/2009 Fukuda ........................ 349/102
2009/0115944 A1* 5/2009 Jeon et al. ..................... 349/96

FOREIGN PATENT DOCUMENTS

JP    10-307291    11/1998
JP    2004-4950    1/2004

* cited by examiner

Primary Examiner—Sung H Pak
(74) Attorney, Agent, or Firm—Buchanan Ingersoll & Rooney PC (57) ABSTRACT

A novel liquid crystal display device is disclosed. The liquid crystal display device comprises a first polarizing film, a first retardation area with an Re of 60 to 200 nm and a value of Nz of less than 0.8 and not greater than 1.5; a second retardation region with an Re of not greater than 50 nm and an Rth of −200 to −50 nm; and a liquid crystal cell comprising a liquid crystal layer being aligned in parallel to the surfaces of the pair of substrates in a black state with a slow axis in a black state parallel to the transmission axis of the first polarizing film; and a second polarizing film.

9 Claims, 3 Drawing Sheets

LIQUID CRYSTAL DISPLAY DEVICE

CROSS-REFERENCE TO RELATED APPLICATIONS

This application claims benefit of priority to Japanese Patent Application No. 2004-138599 filed May 7, 2004.

TECHNICAL FIELD

The present invention relates to a liquid crystal display device and to a ferroelectric liquid crystal display device, an antiferroelectric liquid crystal display device and a liquid crystal display device employing in-plane switching mode which displays images by being applied the crosswise field to nematic liquid crystals aligned in the horizontal direction.

RELATED ART

TN-mode liquid-crystal displays have been used widely. The TN-mode DLC usually comprises two polarizing plates and a liquid-crystal layer formed of twisted-orientated nematic liquid crystal sandwiched in between the polarizing plates, and the field is applied in an orthogonal direction to the substrate of the liquid-crystal layer. In the TN-mode, liquid-crystal molecules tilt against the substrate in a black state, and thus, birefringence due to such an orientation of the liquid-crystal molecules generates when being observed in an oblique direction, and light leakage occurs. In order to solve this problem, liquid-crystal cells are optically compensated by a film formed of hybrid-aligned liquid-crystal molecules, and such liquid-crystal displays are put to practical use. However, it is extremely difficult to optically compensate liquid-crystal cells perfectly even if the film formed of hybrid-aligned liquid-crystal molecules are used, and it is not possible to avoid grayscale inversions generating at under areas of images.

For the purpose of solving such a problem, there have been proposed and put into practical use a liquid crystal display device employing a so-called in-plane switching (IPS) mode, in which the crosswise field are applied to liquid-crystal molecules; employing a so-called fringe field switching (FFS) mode; or employing a vertically aligned (VA) mode, having multi domains divided by projections formed in a panel or slit electrodes. Recently, such liquid-crystal displays have been developed as a panel employed not only in monitors but also in TV, and the brightness thereof has been improved remarkably. Consequently, small light leakage generating at opposing corners in the black state while being observed in an oblique direction has come to the surface as a cause of lowering displaying-quality.

In order to improve color tones or viewing angles in the black state, it has been also tried that an optical compensatory material having a birefringence property is disposed between a liquid-crystal layer and a polarizing plate in an IPS mode or a FFS mode display. Improved liquid crystal displays are disclosed in JPA No. hei 9-80424 (the term "JPA" as used herein means an "unexamined published Japanese patent application (Kohkai Tokkyo Kohou)"), JPA hei 10-54982, JPA No. hei 11-202323, JPA No. hei 9-292522, JPA No. hei 11-133408, JPA No. hei 11-305217 and JPA No. hei 10-307291.

Many of the proposed methods are methods to improve viewing angles by counteracting the birefringence of liquid crystal in the cell, and cannot sufficiently prevent light leakage generating while the liquid-crystal displays are observed in oblique direction, or, in other words, the polarizing axes are out of orthogonal alignment. Some of the proposed methods are for lowering such light leakage and, however, even if such methods are employed, it is extremely difficult to optically compensate the liquid-crystal cell perfectly. Known optical compensatory sheets used for an IPS mode or a FFS mode liquid-crystal cell are thick since they consists of plural films, and this is disadvantageous for thinning of liquid-crystal displays. Some of the optical compensatory sheets are prepared by stacking stretched films with adhesion layers. The adhesion layers shrink depending on variation of temperature or humidity, and, thus, some of the stretched films peel or film warpage is sometimes occurred.

SUMMARY OF THE INVENTION

One object of the present invention is to provide a liquid-crystal display employing an IPS mode, a FFS node or the like, having a simple configuration, improved in not only displaying-qualities but also viewing angles.

In one aspect, the present invention provides a liquid crystal display device comprising, at least, a first polarizing film, a first retardation region, a second retardation region, a liquid crystal cell comprising a liquid crystal layer and a pair of substrates sandwiching the liquid crystal layer with liquid crystal molecules of the liquid crystal layer being aligned in parallel to the surfaces of the pair of substrates in a black state, and a second polarizing film, wherein an in-plane retardation (Re) of the first retardation region is from 60 nm to 200 nm;

a value of Nz of the first retardation region, as defined by [Nz=Rth/Re+0.5] where "Rth" is a retardation in the thickness direction of the first retardation region and "Re" is an in-plane retardation of the first retardation region, exceeds 0.8 and is not greater than 1.5;

an in-plane retardation (Re) of the second retardation region is not greater than 50 nm, any optical axis is not included in a plane of the second retardation region and a retardation (Rth) in the thickness direction of the second retardation region is from −200 nm to −50 nm; and the transmission axis of the first polarizing film is parallel to the slow axis direction of the liquid crystal molecules of the liquid crystal layer in a black state.

As embodiments of the present invention, the liquid crystal display device comprising the first polarizing film, the first retardation region, the second retardation region and the liquid crystal cell in this order wherein a slow axis of the first retardation region is parallel to the transmission axis of the first polarizing film; and the liquid crystal display device comprising the first polarizing film, the second retardation region, the first retardation region and the liquid crystal cell in this order, wherein a slow axis of the first retardation region is orthogonal to the transmission axis of the first polarizing film; are provided.

As other embodiments of the present invention, the liquid crystal display device comprising a pair of protective films sandwiching at least either of the first polarizing film or the second polarizing film wherein at least one of the protective films, disposed in the near side to the liquid crystal layer, has a retardation Rth in the thickness direction of from 40 nm to −50 nm; the liquid crystal display device comprising a pair of protective films sandwiching at least either of the first polarizing film or the second polarizing film wherein at least one of the protective films, disposed in the near side to the liquid crystal layer, has a retardation Rth in the thickness direction of from 20 nm to −20 nm; the liquid crystal display device comprising a pair of protective films sandwiching at least either of the first polarizing film or the second polarizing film wherein at least one of the protective films, disposed in the near side to the liquid crystal layer, has a thickness of not more than 60 μm; the liquid crystal display device comprising a pair of protective films sandwiching at least either of the first polarizing film or the second polarizing film wherein at least one of the protective films, disposed in the near side to the liquid crystal layer, comprises a cellulose acylate film or a norbornene based film; the liquid crystal display device comprising a pair of protective films sandwiching at least either of the first polarizing film or the second polarizing film wherein at least one of the protective films, disposed in the near side to the liquid crystal layer, comprises cellulose acylate having a substitution degree with a acyl group of not smaller than 2.87; and the liquid crystal display device wherein the first retardation region and the second retardation region are disposed in the position closer to the substrate in the opposite side to the view side of the pair of substrates of the liquid crystal cell; are provided.

According to the present invention, it is possible to improve the contrast when LCD is observed in an oblique direction, especially in a 45° oblique direction, and the angle between two transmission axes of two polarizing plates is out of 90°, and to reduce the color variation generating depending on the viewing angle in a black state, without lowering displaying qualities in the frontal direction.

Symbols in the drawings have the following meanings.
1: Liquid crystal element pixel region
2: Pixel electrode
3: Display electrode
4: Rubbing direction
5a, 5b: Director of liquid crystal compound in a black state
6a, 6b: Director of liquid crystal compound in a white state
7a, 7b, 19a, 19b: Protective film for polarizing film
8, 20: Polarizing film
9, 21: Polarization transmission axis of polarizing film
10: First retardation region
11: Slow axis of first retardation region
12: Second retardation region
13, 17: Cell substrate
14, 18: Rubbing direction of cell substrate
15: Liquid crystal layer
16: Slow axis direction of liquid crystal layer

DETAILED DESCRIPTION OF THE INVENTION

Hereafter, the present invention will be explained in detail. In the specification, ranges indicated with "to" mean ranges including the numerical values before and after "to" as the minimum and maximum values.

In the specification, Re and Rth respectively mean an in-plane retardation and retardation in a thickness-direction at wavelength 550 nm. The Re is measured by using KOBRA-21ADH (manufactured by Oji Scientific Instruments) for an incoming light of a wavelength 550 nm in a direction normal to a film-surface. The Rth is calculated by using KOBRA-21ADH based on three retardation values; first one of which is the Re obtained above, second one of which is retardation which is measured for an incoming light of a wavelength 550 nm in a direction rotated by +40° with respect to the normal direction of the film around an in-plane slow axis, which is decided by KOBRA 21ADH, as an inclining axis (a rotation axis), and third one of which is a retardation which is measured for an incoming light of a wavelength 550 nm in a direction rotated by −40° with respect to the normal direction of the film around an in-plane slow axis as an inclining axis (a rotation axis); a hypothetical mean refractive index and an entered thickness value of the film. The mean refractive indexes of various materials are described in published documents such as "POLYMER HANDBOOK" (JOHN WILEY & SONS, INC) and catalogs. If the values are unknown, the values may be measured with Abbe refractometer or the like. The mean refractive indexes of major optical films are exemplified below:

cellulose acylate (1.48), cyclo-olefin polymer (1.52), polycarbonate (1.59), polymethyl methacrylate (1.49), polystyrene (1.59).

When the hypothetical mean refractive index and a thickness value are put into KOBRA 21ADH, nx, ny and nz are calculated.

Being measured for an incoming light of a wavelength 550 nm in a direction rotated by +20° with respect to the normal direction of the film around an in-plane slow axis (as a rotation axis), when the obtained value is greater than the Re value, the Rth is decided to be positive; and, on the other hand, when the obtained value is lower than the Re value, the Rth is decided to be negative. For a sample film having the |Rth/Re| value of not smaller than 9, being observed using a polarization microscope equipped with a rotatable base with an incoming light of a wavelength 550 nm in a direction rotated by +40° with respect to the normal direction of the film around an in-plane slow axis (as a rotation axis), when the slow axis to be decided by an inspection polarizing plate is parallel to the surface of the sample film, the Rth is decided to be positive; and, on the other hand, when the slow axis is in a thickness direction, the Rth is decided to be negative.

In the specification, the term of "A is parallel to B", the term of "A is orthogonal to B" or "A is perpendicular to B" means that the angle between A and B falls within a range of an exact angle ±10°. The angle desirably falls within a range of an exact angle ±5°, and more desirably within a range of an exact angle ±2°. The term of "slow axis" means a direction giving a maximum refractive index. As long as written specifically, refractive indexes are measured at 550 nm.

In the specification, the terms of "polarizing plate" means not only polarizing plates having a proper size to be employed in a liquid-crystal but also long polarizing plates before being cut. And in the specification, the terms of "polarizing film" is distinct from the term "polarizing plate", and the term of "polarizing plate" is used for any laminated body comprising a "polarizing film" and at least one protective film thereon.

Figure 1:
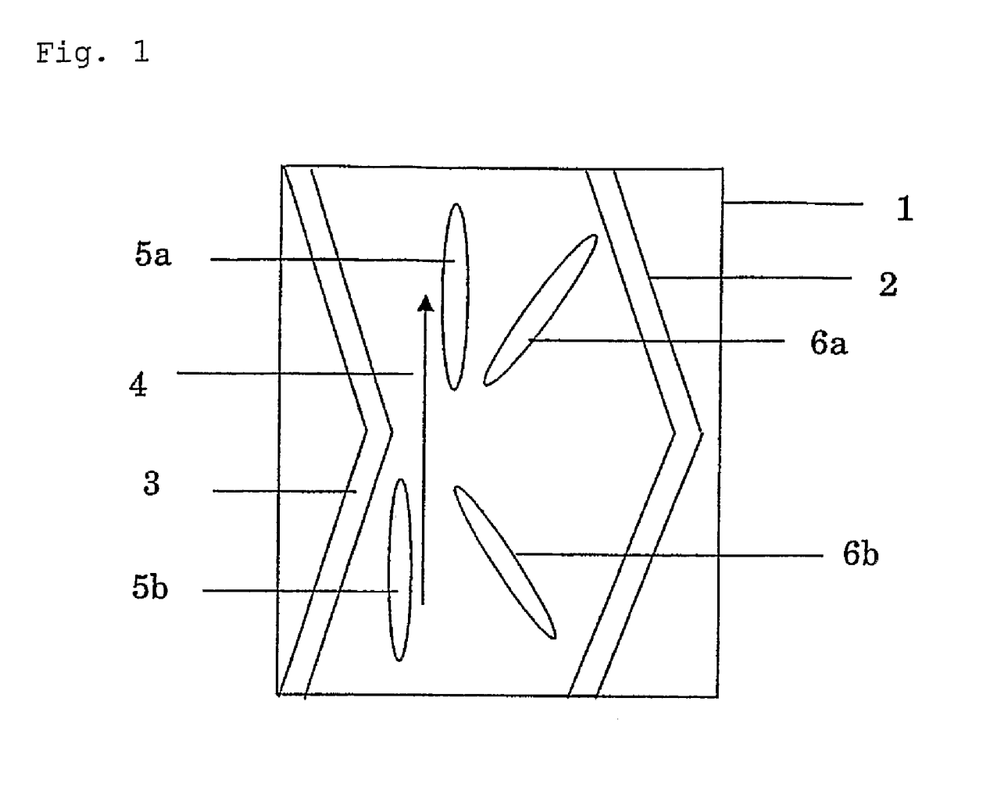
FIG. 1 is a schematic view to show an example of a pixel region of a liquid crystal display device of the invention.
Figure 2:
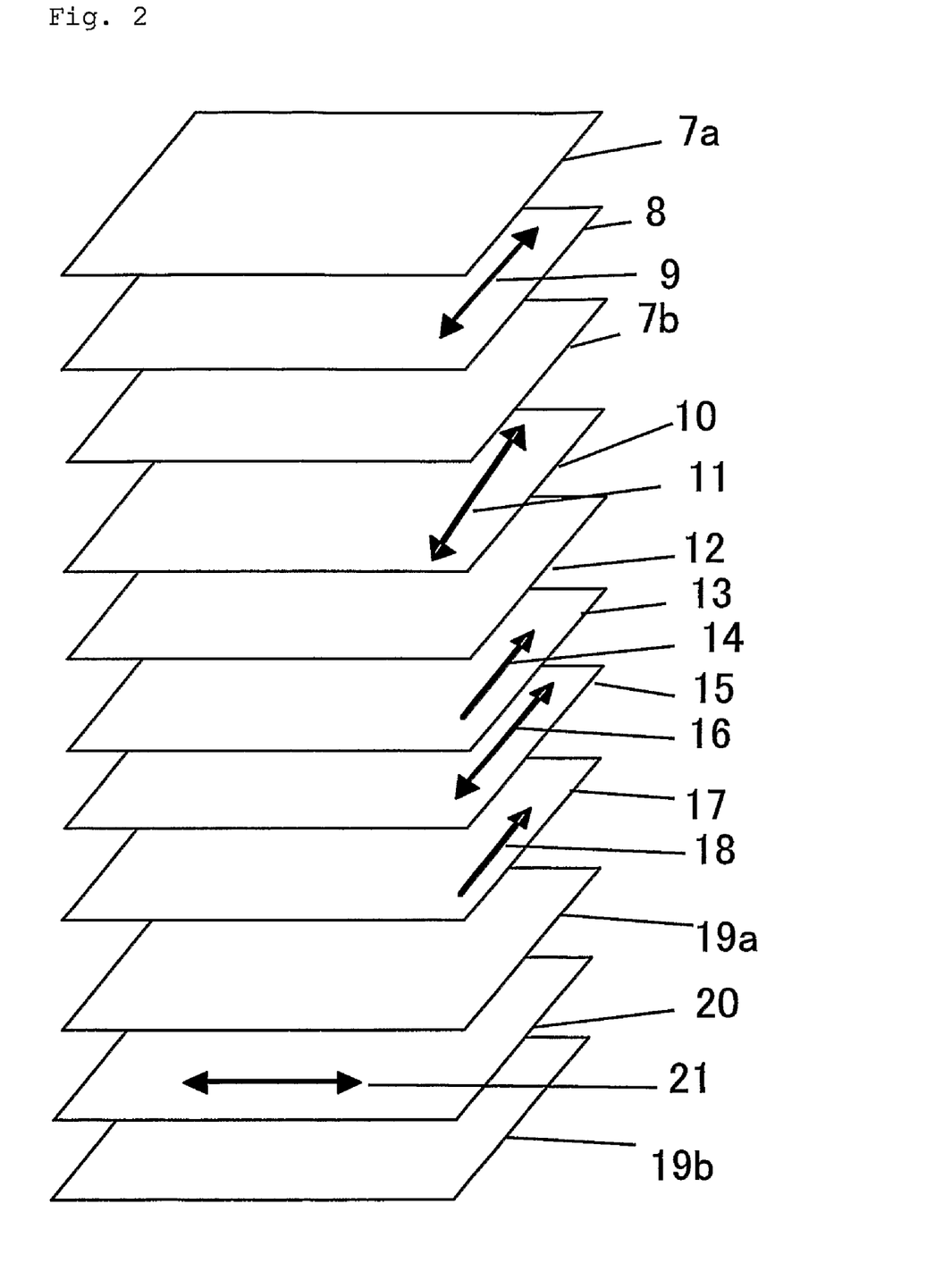
FIG. 2 is a schematic view to show one example of a liquid crystal display device of the invention.
Figure 3:
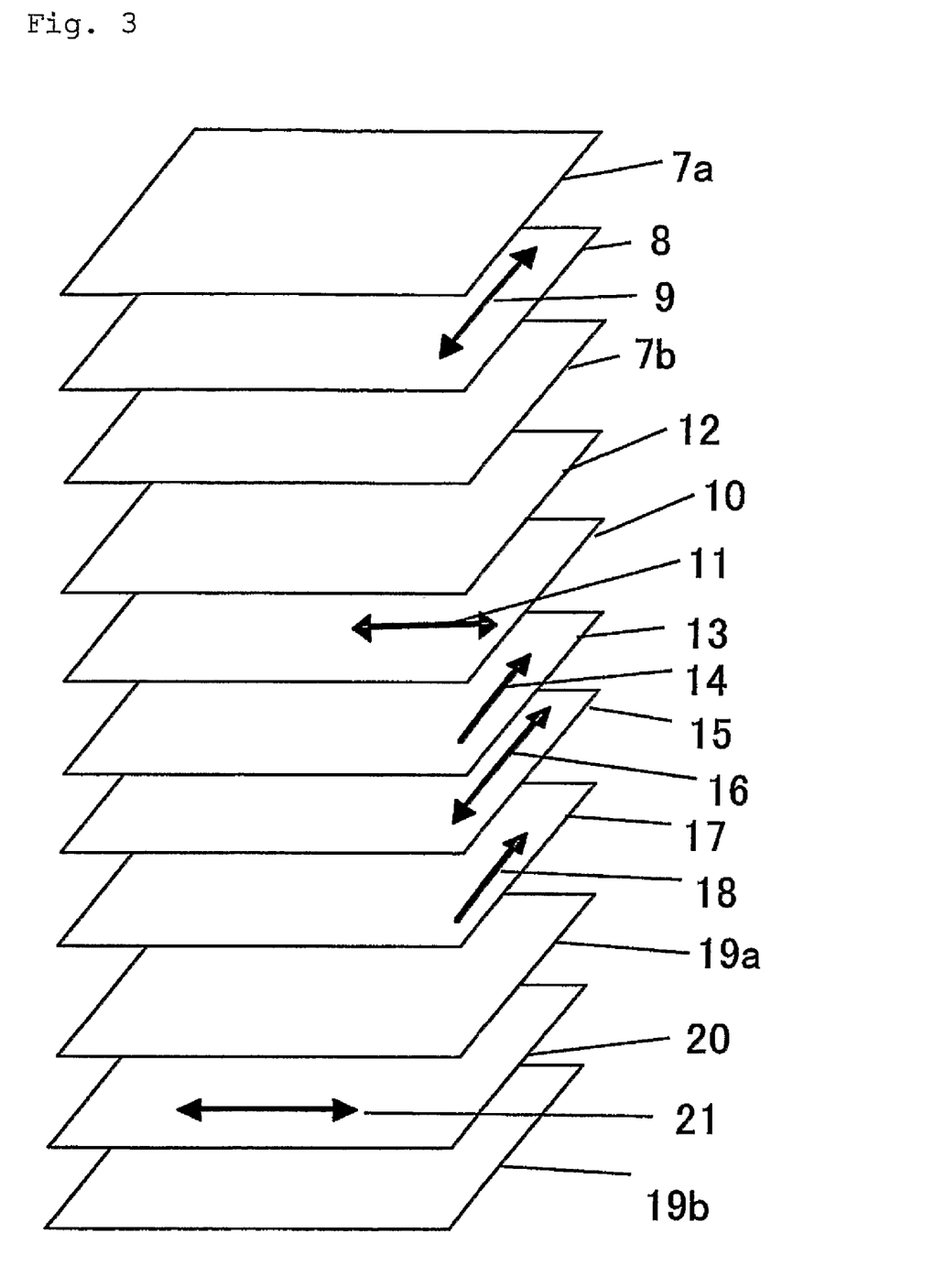
FIG. 3 is a schematic view to show another example of a liquid crystal display device of the invention.

Embodiments of the invention will be hereunder described with reference to the drawings. FIG. 1 is a schematic view to show an example of a pixel region of a liquid crystal display device of the invention. FIG. 2 and FIG. 3 are viewings respectively showing one embodiment of a liquid crystal display device of the invention.

[Liquid Crystal Display Device]

A liquid crystal display device as illustrated in FIG. 2 comprises polarizing films 8 and 20, a first retardation region 10, a second retardation region 12, and a liquid crystal cell comprising a pair of substrates 13 and 17 and a liquid crystal layer 15 interposed therebetween. The polarizing films 8 and 20 are interposed by protective films 7a and 7b and 19a and 19b, respectively.

The liquid-crystal display shown in FIG. 2, a liquid-crystal cell comprises the substrates 13 and 17 and the liquid-crystal layer 15 sandwiched in between them. For an IPS-mode liquid-crystal cell without twisting structures in a transmission mode, the best value of product ($\Delta n \cdot d$) of a thickness of a liquid-crystal layer, d (μm), and a refractive-index anisotropy, $\Delta n$, is 0.2 to 0.4 μm. When the product is set in the range, the liquid-crystal display, giving a high brightness in a white state and a low brightness in a black state, or, in other words, giving a high contrast and high brightness, can be obtained. Alignment layers (not shown) are formed on the surfaces, contacting the liquid-crystal layer 15, of the substrates 13 and 17, and thus, the liquid-crystal molecules are aligned parallel to the surfaces of the substrates and their orientations are controlled along with rubbing directions 14 and 18 of the alignment layers, in the field-free state or in the low-field applied state, thereby deciding the direction of a slow axis 16 thereof. And electrodes (not shown in FIG. 2), which can apply the field to liquid-crystal molecules, are formed on the inner surfaces of the substrates 13 or 17.

A viewing showing the orientation of liquid-crystal molecules in a pixel area of the liquid-crystal layer 15 is shown in FIG. 1. FIG. 1 is a viewing showing the orientation of liquid-crystal molecules in an extremely small area corresponding to a pixel area with the rubbing direction 4 applied to the surfaces of the substrates 13 and 17 and electrodes 2 and 3, formed on the inner surfaces of the substrates 13 and 17 to apply the field to liquid-crystal molecules. When nematic liquid crystal, having a positive dielectric-constant anisotropy, is used as a field-effect type liquid crystal and active driving is carried out, the orientations of the liquid-crystal molecules are 5a and 5b in the field-free state or the low-field-applied state, and, then, this state displays black. When the field is applied between the electrodes 2 and 3, the liquid-crystal molecules change the orientations from the directions 5a and 5b to the directions 6a and 6b. Usually, this state displays white.

Also, the liquid crystal cell to be used in the invention is not limited to the IPS mode or the FFS mode but can be suitably used for all of liquid crystal display devices so far as liquid crystal molecules are aligned substantially in parallel to the surfaces of the foregoing pair of substrates at the time of black display. Examples thereof include a ferroelectric liquid crystal display device, an antiferroelectric liquid crystal display device, and an ECB mode liquid crystal display device.

To return to FIG. 2, the transmission axis 9 of the polarizing film 8 is orthogonal to the transmission axis 21 of the polarizing film 20. Also, the slow axis 11 of the first retardation region 10 is parallel to the transmission axis 9 of the polarizing film 8. Further, the transmission axis 9 of the polarizing film 8 and the slow axis 16 of the liquid crystal molecules in the liquid crystal layer 15 in a black state are parallel to each other, that is, the slow axis 11 of the first retardation region 10 and the slow axis 16 of the liquid crystal layer 15 in a black state are parallel to each other. In this embodiment, not only the first retardation region 10 exhibiting specific optical characteristics as described later is disposed in this way, but also the second retardation region 12 having specific optical characteristics as described later is disposed between the first retardation region 10 and the liquid crystal cell, thereby improving viewing angle properties of the liquid crystal cell.

In the liquid crystal display device as illustrated in FIG. 2, though the construction in which the polarizing film 8 is sandwiched by the two sheets of the protective films 7a and 7b is shown, the protective film 7b may be omitted. However, in the case where the protective film 7b is not disposed, the first retardation region 10 must have not only specific optical characteristics as described later but also a function to protect the polarizing film 8. In the case where the protective film 7b is disposed, a retardation Rth in the thickness direction of the subject protective film is preferably from −50 to 40 nm and more preferably from −20 to 20 nm. Further, while the polarizing film 20 is also sandwiched by the two sheets of the protective films 19a and 19b, the protective film 19a in the near side to the liquid crystal layer 15 may be omitted. In the case where the protective film 19a is disposed, a preferred range of a retardation Rth in the thickness direction of the subject protective film is the same as that in the protective film 7b. Moreover, it is preferable that the protective film 7b and the protective film 19a have a thin thickness, and specifically, the thickness is preferably not more than 60 μm.

In the embodiment of FIG. 2, the first retardation region 10 and the second retardation region 12 may be disposed between the liquid crystal cell and the polarizing film 8 in the view side, or may be disposed between the liquid crystal cell and the polarizing film 20 in the back face side on the basis of the position of the liquid crystal cell. From the point of the yield, the latter embodiment is preferred. In any of these embodiments, the second retardation region 12 is disposed closer to the liquid crystal cell.

Another embodiment of the invention is illustrated in FIG. 3. In FIG. 3, the same members as those in FIG. 2 are given the same symbols, and their detailed description is omitted. In the liquid crystal display device as illustrated in FIG. 3, the positions of the first retardation region 10 and the second retardation region 12 are exchanged, and the first retardation region 10 is disposed at the position far from the polarizing film 8 as compared with the second retardation region 12, that is, the first retardation region 10 is disposed at the position closer to the liquid crystal cell. Also, in the embodiment as illustrated in FIG. 3, in the first retardation region 10, its slow axis 11 is disposed in orthogonal to the transmission axis 9 of the polarizing film 8. Further, the transmission axis 9 of the polarizing film 8 is parallel to the slow axis 16 of the liquid crystal molecules in the liquid crystal layer 15 in a black state, that is, the slow axis 11 of the first retardation region 10 and the slow axis 16 of the liquid crystal layer 15 in a black state are orthogonal to each other. In this embodiment, not only the first retardation region 10 exhibiting specific optical characteristics as described later is disposed in this way, but also the second retardation region 12 having specific optical characteristics as described later is disposed between the first retardation region 10 and the polarizing film 8, thereby improving viewing angle characteristics of the liquid crystal cell.

In the liquid crystal display device as illustrated in FIG. 3, the protective film 7b may be omitted as well as in FIG. 2. However, in the case where the protective film 7b is not disposed, the first retardation region 10 must have not only specific optical characteristics as described later but also a function to protect the polarizing film 8. In the case where the protective film 7b is disposed, a retardation Rth in the thickness direction of the subject protective film is preferably from −50 to 40 nm and more preferably from −20 to 20 nm. Further, while the polarizing film 20 is also sandwiched by the two sheets of the protective films 19a and 19b, the protective film 19a in the near side to the liquid crystal layer 15 may be omitted. In the case where the protective film 19a is disposed, a preferred range of a retardation Rth in the thickness direction of the subject protective film is the same as that in the protective film 7b. Moreover, it is preferable that the protective film 7b and the protective film 19a have a thin thickness, and specifically, the thickness is preferably not more than 60 µm.

In the embodiment of FIG. 3, the first retardation region 10 and the second retardation region 12 may be disposed between the liquid crystal cell and the polarizing film 8 in the view side, or may be disposed between the liquid crystal cell and the polarizing film 20 in the back face side on the basis of the position of the liquid crystal cell. In any of these embodiments, the first retardation region 10 is disposed so as to make it closer to the liquid crystal cell.

The liquid crystal display device of the invention is not limited to the constructions as illustrated in FIG. 1 to FIG. 3 but may contain other members. For example, a color filter may be disposed between the liquid crystal layer and the polarizing film. Also, an antireflection treatment or a hard coat may be applied on the surface of the protective film of the polarizing film. Also, the constituent members having been imparted conductivity may be employed. Also, in the case where the liquid crystal display device is of a transmission mode, a cold cathode or hot cathode fluorescent tube, or a backlight using a light emission diode, a field emission element or an electroluminescent element as a light source can be disposed on the back face. In this case, the backlight may be disposed in the upper side or lower side of each of FIG. 2 and FIG. 3. However, since the necessity for combining an antireflection or antistatic treated polarizing plate having a slightly high fraction defective is low, it is more preferable that the backlight is disposed in the lower side in the drawing. Also, a reflection type polarizing plate or diffusion plate, or a prism sheet or light guide plate can be disposed between the liquid crystal layer and the backlight. Also, as described previously, the liquid crystal display device of the invention may be of a reflection type. In such case, only one sheet of the polarizing plate may be disposed in the observation side, and a reflection film is disposed on the back face of the liquid crystal cell or on the internal surface of the substrate in the lower side of the liquid crystal cell. As a matter of course, it is possible to provide a front light using the foregoing light source in the observation side of the liquid crystal cell.

Embodiments of the present invention include direct types projection types and light modulation types. The embodiments of active-matrix liquid-crystal displays comprising a 3 or 2 terminal semiconductor device such as a TFT or a MIM are especially effective. The embodiments of passive matrix, or, in other words, time-division driving, liquid-crystal displays are effective as well as the above embodiments.

Optical characteristics of various members which can be used in the liquid crystal display device of the invention, materials to be used in the members, and manufacturing methods thereof will be hereunder described in detail.

[First Retardation Region]

In the liquid crystal display device of the invention, the first retardation region has an in-plane retardation Re of from 60 nm to 200 nm. For the sake of effectively reducing the light leakage in the oblique direction, the Re of the first retardation region is more preferably from 70 nm to 180 nm, and further preferably from 90 nm to 160 nm. Also, Nz, as defined by [Nz=Rth/Re+0.5] where "Rth" is a retardation in the thickness direction of the first retardation region, exceeds 0.8 and is not greater than 1.5; and for the sake of effectively reducing the light leakage in the oblique direction, the Nz of the first retardation region is more preferably from 0.9 to 1.3, and much more preferably from 0.95 to 1.2. What the Nz is 0.8 or less is not preferable because the value of Re necessary for enhancing the contrast becomes large, an extremely high precision of sticking to the polarizing plate becomes necessary.

According to the present invention, the first retardation region is not particularly limited with respect to the material and shape thereof so far as it exhibits the foregoing optical characteristics. For example, any retardation films formed of a birefringent polymer film, any films produced by applying a composition comprising a high-molecular-weight compound on a transparent support and then heating it, and any retardation films comprising a retardation layer produced by coating or transferring a composition comprising a low-molecular-weight or a high-molecular-weight liquid crystalline compound on a transparent support can be used. The first retardation region may comprise plural layers, and in such an embodiment, two or more birefringent films, two or more retardation layers or at least one birefringent layer and at least one retardation layer may be stacked.

As the birefringent polymer film which can be employed in the present invention as the first retardation area, polymer films having excellent controllability of birefringence characteristics, transparency or heat resistance and having small photoelasticity are preferable. In this case, though the high molecular weight material to be used is not particularly limited so far as it can achieve uniform uniaxial or biaxial alignment, high molecular weight materials which can be formed into a film by a solvent casting method or an extrusion molding system are preferable. Examples thereof include polycarbonate based polymers, polyarylate based polymers, polyester based polymers, aromatic polymers such as polysulfones, polyolefins such as polypropylene, cellulose acylate, and polymers made of a mixture of two or three or more kinds of these polymers.

It is noted that, as far as having the optical properties, any embodiments comprising no retardation layer formed of a polymer having an alicyclic moiety in the first retardation region fall within the scope of the present invention.

The biaxial alignment of a film can be achieved by a stretching the subject film, which can be prepared by an appropriate system such as an extrusion molding system or a film-casting system, with an appropriate system such as a longitudinal stretching system by rolls or a transverse stretching system or a biaxial stretching system by a tenter. Also, the subject film can be prepared by controlling the refractive index in the thickness direction by a method for uniaxially or biaxially stretching the film in the plane direction and also stretching in the thickness direction, or the like. Also, the subject film can be obtained by bonding a heat-shrinkable film to a polymer film, stretching and/or shrinking the polymer film with the heat-shrinkable film under a shrinking force of the heat-shrinkable film by heating to achieve the alignment (such method is described in JP-A-5-157911, JP-A-11-125716, JP-A-2001-13324 and the like). The foregoing longitudinal stretching with rolls may be carried out under heating with an appropriate heating method such as heating by heat rolls, heating the atmosphere, and a method for using these methods in combination. Also, for the biaxial stretching system by a tenter, there can be employed appropriate methods such as a simultaneous biaxial stretching method by a full tenter system and a sequential biaxial stretching method by a roll/tenter method.

Also, ones which are less in uneven alignment or uneven retardation are preferable. Though the thickness of the film can be properly determined depending upon the retardation and the like, in general, it is preferably from 1 to 300 µm, more preferably from 10 to 200 µm, and further preferably from 20 to 150 µm in view of thinning.

[Second Retardation Region]

According to the present invention, it is preferable that the refractive indexes nx and ny in the plane of the second retardation region are substantially equal to each other, and a difference therebetween is preferably not more than 0.05, more preferably not more than 0.02, and further preferably not more than 0.01. Any optical axis is not included in a plane of the second retardation region. Also, the second retardation region preferably has an in-plane retardation Re of not more than 100 nm. The Re is more preferably not more than 50 nm, and further preferably not more than 20 nm. Also, from the point of reducing the light leakage, a retardation Rth in the thickness direction is preferably from −200 nm to −50 nm, more preferably from −180 nm to −60 nm, and further preferably from −160 nm to −70 nm. It is noted that the Rth of the second retardation region may vary depending on the optical properties of other optical members, and especially depending on the Rth of the protective film, disposed closer it, such as a triacetyl cellulose film.

The arrangement of the slow axis of the second retardation area is not limited to, and, however, in the embodiment, shown in FIG. 2, comprising the second retardation region having an Re of not less than 20 nm, the slow axis of the second retardation region is parallel to the transmission axis of the polarizing film disposed closer; and in the embodiment, shown in FIG. 3, comprising the second retardation region having an Re of not less than 20 nm, the slow axis of the second retardation region is orthogonal to the transmission axis of the polarizing film disposed closer. Such arrangements are preferred since the thickness of the first retardation region region can be reduced.

The foregoing second retardation region is not particularly limited with respect to the material thereof so far as it has the foregoing optical characteristics. For example, any retardation films formed of a birefringent polymer film and any films comprising a retardation layer produced by coating or transferring a composition comprising a low-molecular or high-molecular weight liquid crystalline compound on a transparent support can be used. The second retardation region may comprise plural layers, and in such an embodiment, two or more birefringent films, two or more retardation layers or at least one birefringent layer and at least one retardation layer may be stacked.

The retardation film formed of a birefringent polymer film having the foregoing optical characteristics can be produced by applying a tension to a polymer film with a heat shrinkable film put on it under heating, thereby stretching the polymer film in the thickness direction (such a process is described in JPA No. 2000-206328, JPA No. 2000-304925 or the like); or by applying and drying a coating solution of a vinyl carbazole series polymer (such a process is described in JPA No. 2001-091746 or the like).

The retardation layer formed of a composition comprising a liquid crystalline compound having the foregoing optical characteristics can be produced by coating a cholesteric discotic liquid crystalline compound or composition containing a chiral structural unit on a substrate or a temporary substrate, aligning its helical axis substantially vertically to the substrate, and then fixing it. They can be also produced by coating a rod-like liquid-crystal compound or composition with a positive refractive index anisotropy on a substrate or a temporary substrate, aligning the rod-like molecules substantially vertically to the substrate, and then fixing it. Such retardation layers are disclosed in JPA No. hei 6-331826, Japanese patent No. 2853064 or the like. In the case where the foregoing retardation layer is formed on a temporary substrate, it can be prepared by transferring the formed retardation layer onto a substrate. The rod-like liquid crystal compound may be a low molecular compound or a high molecular compound. Further, the second retardation region having the optical characteristics can be constructed by laminating a plural number of retardation layers in addition to one sheet of the retardation layer. Also, the second retardation region can be constructed such that the whole of a laminate of the support and the retardation layer meets the foregoing optical characteristics. As the rod-like liquid crystal compound to be used, ones taking the state of a nematic liquid crystal phase, a smectic liquid crystal phase, or a lyotropic liquid crystal phase in the temperature range at which alignment and fixing are performed are suitably used. Liquid crystals exhibiting smectic A phase and B phase, from which uniform vertical alignment free from fluctuation is obtained, are preferable. In particular, with respect to the rod-like liquid crystalline compound which becomes in the foregoing liquid crystal state in a proper alignment temperature range in the presence of additives, it is also preferred to form the layer by using a composition containing the subject additives and the rod-like liquid crystalline compound.

Examples of the rod-like liquid-crystal compound usable for preparation of the second retardation region include azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolans, and alkenylcyclohexylbenzonitriles. Not only such low-molecular liquid-crystal compounds, but also high-molecular liquid-crystal compounds may also be usable herein. Liquid crystal materials having a moiety capable of polymerization reaction or cross-linking reaction are preferably used. The preferred number of such moiety contained in the liquid crystal molecule is from 1 to 6, and more preferably from 1 to 3.

Among retardation layers produced by aligning rod-like liquid crystal molecules and fixing them in the alignment state, retardation layers produced by aligning rod-like liquid crystal molecules substantially vertically and fixing them in the vertical alignment state are preferred used in the second retardation region. The term of "substantial vertical alignment" means that the angle between a substrate surface and a director of rod-like molecules falls within the range from 70° to 90°. The rod-like liquid-crystal molecules may be aligned obliquely, or may be so aligned that its tilt angle gradually varies (hybrid alignment). In the case of tilt alignment or hybrid alignment, it is desirable that the mean tilt angle falls within the range from 70° to 90°, more preferably from 80° to 90°, most preferably from 85° to 90°.

The retardation layer may be produced by coating a solution containing a rod-like liquid crystal compound, and, if necessary, other additives such as a polymerization initiator or an air-interface vertical alignment agent on a support, aligning rod-like molecules vertically and fixing them in the vertical alignment. In the case where the foregoing retardation layer is formed on a temporary substrate, it can be prepared by transferring the formed retardation layer onto a substrate. Further, the second retardation region having the optical characteristics can be constructed by laminating a plural number of retardation layers in addition to one sheet of the retardation layer. Also, the second retardation region can be constructed such that the whole of a laminate of the support and the retardation layer meets the foregoing optical characteristics.

The solvent used for preparation of the coating solution is desirably selected from organic solvents. Examples of the organic solvent include amides such as N,N-dimethylformamide, sulfoxides such as dimethylsulfoxide, heterocyclic compounds such as pyridine, hydrocarbon compounds such as benzene or hexane, alkyl halides such as chloroform or dichloromethane, esters such as methyl acetate or butyl acetate, ketones such as acetone or methyl ethyl ketone, or ethers such as tetrahydrofuran or 1,2-dimethoxyethane. Among these, alkyl halides or ketones are preferred. Two or more types of organic solvents may be used in combination. The coating liquid can be applied by known techniques (e.g., extrusion coating, direct gravure coating, reverse gravure coating and die coating).

The liquid-crystal molecules may be fixed in the vertical alignment state. The liquid-crystal molecules are desirably fixed by polymerization reaction of the polymerizable group (P). Polymerization reactions include thermal polymerization reactions employing a thermal polymerization initiator and photo-polymerization reactions employing a photo-polymerization initiator. A photo-polymerization reaction is preferred. Examples of photo-polymerization initiators are alpha-carbonyl compounds (described in U.S. Pat. Nos. 2,367,661 and 2,367,670), acyloin ether (described in U.S. Pat. No. 2,448,828), alpha-hydrocarbon-substituted aromatic acyloin compounds (described in U.S. Pat. No. 2,722,512), polynuclearquinone compounds (described in U.S. Pat. Nos. 3,046,127 and 2,951,758), combinations of triarylimidazole dimers and p-aminophenyl ketones (described in U.S. Pat. No. 3,549,367), acridine and phenadine compounds (described in JPA No. sho 60-105667 and U.S. Pat. No. 4,239,850), and oxadiazole compounds (described in U.S. Pat. No. 4,212,970).

The amount of photo-polymerization initiator employed is desirably from 0.01 to 20 weight percent, preferably from 0.5 to 5 weight percent, of the solid portion of the coating liquid. Irradiation for polymerization of rod-like liquid-crystal molecules is desirably conducted with ultraviolet radiation. The irradiation energy is desirably from 20 mJ/cm$^2$ to 50 J/cm$^2$, preferably from 100 to 800 MJ/cm$^2$. Irradiation may be conducted under heated conditions to promote the photo-polymerization reaction.

The whole thickness of the second retardation region comprising the retardation layer is preferably from 0.1 to 10 μm, more preferably from 0.5 to 5 μm and much more preferably from 1 to 5 μm.

For aligning liquid-crystal molecules vertically, alignment layers are preferably used. Among them, the alignment layers with a low surface energy are effective. In particular, the functional groups of the polymer in the alignment layer reduce the surface energy of the alignment layer, to align liquid-crystal molecules vertically. Fluorine atom or hydrocarbon groups having 10 or more carbon atoms are effective as the functional group capable of reducing the surface energy of the alignment layer. A fluorine atom or a hydrocarbon group is preferably introduced into side chain rather than into main chain, for existing them at the surface of the alignment layer. The amount of fluorine atoms included in a fluoride-polymer is desirably from 0.05 to 80 wt %, more desirably from 0.1 to 70 wt %, much more desirably from 0.5 to 65 wt % and further much more desirably from 1 to 60 wt %. The hydrocarbon group is selected from aliphatic groups, aromatic group and any combinations thereof. The aliphatic group may have a cyclic, branched chain or linear chain structure. The aliphatic group is desirably selected from alkyl groups (including cycloalkyl groups) or alkenyl groups (including cycloalkenyl groups). The hydrocarbon group may have a low-hydrophilic substituent such as a halogen atom. The carbon atom number of the hydrocarbon group is desirably from 10 to 100, more desirably from 10 to 60, and much more desirably from 10 to 40. The main chain of the polymer desirably has a polyimide or polyvinyl alcohol structure.

Generally, polyimides are produced by condensation reaction of tetra-carboxylic acids and diamines. Copolymer-like polyimides which are produced by condensation reactions of plural tetra-carboxylic acids and plural diamines may be used. Fluorine atoms or hydrocarbon groups may exist in repeating units derived from tetra-carboxylic acids and/or in repeating units derived from diamines. When hydrocarbon groups are introduced into polyimide, it is preferred that steroid structure is formed in main chain or side chain of the polyimide. The steroid structure existing in side chain corresponds to the hydrocarbon group having 10 or more carbon atoms and contributes to aligning liquid-crystal molecules vertically. In the specification, the term of "steroid structure" is used any cyclopentanone phenanthrene ring structures or any ring structures which can be obtained by replacement of a part of single bonds thereof with double bonds within a replacement range such that the rings are cycloaliphatic or, in other words, the rings don't form aromatic rings.

The liquid-crystal compounds may be aligned vertically by mixing an organic acid with polymers such as polyvinyl alcohol, modified polyvinyl alcohol or polyimide. Examples of the organic acid to be mixed include carboxylic acids, sulfonic acids and amino acids. Among vertical-alignment agents, described below, the agent exhibiting acidity may be used. The amount of the organic acid is desirably from 0.1 to 20 wt %, and more desirably from 0.5 to 10 wt % with respect to the weight of polymer.

The saponification degree of the polyvinyl alcohol is desirably from 70 to 100%, and more desirably from 80 to 100%. The polymerization degree of the polyvinyl alcohol is desirably from 100 to 5000.

For aligning discotic liquid-crystal molecules, an alignment layer formed of a polymer of which side chains have a hydrophobic group as a function group is desirably used. The types of the function group may be decided depending on various factors such as types of the liquid-crystal compounds or desired alignment state. For example, the modification group can be introduced into the polyvinyl alcohol by copolymerization modification, chain-transfer modification or bloc-polymerization modification. Examples of the modified group include hydrophilic groups such as a carboxylic acid group, a sulfonic acid group, a phosphoric acid group, an amino group, an ammonium group, an amide group or a thiol group; $C_{10-100}$ hydrocarbon groups; hydrocarbon groups substituted with fluorine atoms; thioether groups, polymerizable groups such as an unsaturated polymerizable group, an epoxy group or an aziridile group; and alkoxysilyl groups such as tri-, di- or mono-alkoxysilyl group. Specific examples of such modified polyvinyl alcohols include those described in the columns [0022] to [0145] in JPA No. 2000-155216 and those described in the columns [0018] to [0022] in JPA No. 2002-62426.

When a polymer having a main chain bonding to side chains containing a crosslinkable functional group, or a polymer having side chain being capable of aligning liquid-crystal molecules and containing a crosslinkable functional group is used for forming an alignment layer, and a composition comprising a multi-functional monomer is used for preparing a retardation layer, it is possible to copolymerize the polymer in the alignment layer and the multi-functional monomer in the retardation layer formed on the alignment layer. In such case, not only between the multi-functional monomers but also between the polymers in the alignment layer and between the multi-functional monomers and the polymers in the alignment layer, the covalent bondings are formed and the bonding strengths between the alignment layer and the retardation layer are improved. The polymer in the alignment layer desirably has crosslinkable functional group containing a polymerizable group. Specific examples include those described in the columns of [0080] to [0100] in JPA No. 2000-155216.

The polymer in the alignment layer may be crosslinked by a crosslinkable agent. Examples of the crosslinkable agent include aldehydes, N-methylol compounds, dioxane derivatives, compounds to act when being activated their carboxyl groups, active vinyl compounds, active halogen compounds, isoxazoles and dialdehyde starches. A single or plural type of crosslinkable agents may be used. Specific examples of the crosslinkable agent include the compounds described in the columns [0023] to [0024] in JPA No. 2002-62426. Aldehydes having a high reaction-activity are preferred, and glutaraldehydes are more preferred.

The amount of the crosslinkable agent is desirably set from 0.1 to 20 wt %, and more desirably 0.5 to 15 wt %, with respect to the weight of the polymer. The residual amount of the unreacted crosslinkable-agent in the alignment layer is desirably not greater than 1.0 wt %, and more desirably not greater than 0.5 wt %. When the residual amount falls within the range, the alignment layer has a sufficient durability, and even if the alignment layer is used in a liquid-crystal display for a long time, or is left under a high temperature and humidity atmosphere for a long time, no reticulation is appeared in the alignment layer.

The alignment layer may be prepared by applying a coating liquid, containing the above polymer, and, if necessary, the crosslinkable agent, to a surface of a transparent substrate, drying under heating (crosslinking), and performing a rubbing treatment. The crosslinking reaction may be carried out at any time after applying the coating liquid. When a water-soluble polymer such as polyvinyl alcohol is used for preparation of an alignment layer, the coating liquid is desirably prepared using a mixed solvent of an organic solvent such as methanol, exhibiting a deforming function, and water. The weight ratio of water to methanol is desirably from 0/100 to 99/1, and more desirably from 0/100 to 91/9. Using such a mixed solvent can prevent bubbles from generating, and can remarkably reduce defects in the surface of the alignment layer and the retardation layer.

The coating liquid may be applied by any known method such as a spin-coating method, a dip coating method, a curtain coating method, extrusion coating method, rod coating method, or roll coating method. The rod coating method is especially preferred. The thickness of the alignment layer after being dried is desirably from 0.1 to 10 micrometers. Drying may be carried out at 20 to 110° C. In order to form sufficient crosslinking, drying is desirably carried out at 60 to 100° C., and more desirably at 80 to 100° C. The drying may be continued for 1 minute to 36 hours, and desirably for 1 minute to 30 minutes. The pH is desirably set in a proper range for a crosslinkable agent to be used, and when glutaraldehyde is used, the pH is desirably set within a range from 4.5 to 5.5, and more desirably 5. The alignment layer may be formed on a transparent substrate.

The alignment layer may be used after the crosslinking reaction. For aligning rod-like liquid-crystal molecules, it is not preferable that rubbing treatment is subjected to the surface of the alignment layer. It is also possible to align liquid crystalline molecules with an alignment layer, then fixing the liquid crystalline molecules in such aligned state to form the retardation layer and to transfer such retardation layer only onto a polymer film (or transparent substrate).

Since a liquid crystalline compound generally has a property of being aligned in a tilted state at an interface with the air, it is necessary, in order to obtain a state in which the liquid crystalline molecules are uniformly aligned vertically, to control the alignment of the molecules at the air interface side. For this purpose, it is preferable to prepare a retardation layer by using a compound which can be localized at the side of the interface with the air and exerts an effect of aligning the liquid crystalline molecules vertically, by a volumic excluding effect and an electrostatic effect. Such compound may be contained in a coating liquid for preparation of the retardation layer.

Examples of the additive for controlling alignment at the air-interface include those described in JPA No. 2002-20363, JPA No. 2002-129162 or the like. Those described in the columns [0072] to [0075] of Japanese Patent Application No. 2002-212100, in the columns [0037] to [0039] of Japanese Patent Application No. 2002-262239, in the columns [0071] to [0078] of Japanese Patent Application No. 2003-91752, in the columns [0052] to [0054], [0065] to [0066] and [0092] to [0094] of Japanese Patent Application No. 2003-119959, in the columns [0028] to [0030] of Japanese Patent Application No. 2003-330303 and in the columns [0087] to [0090] of Japanese Patent Application No. 2004-3804. Also the inclusion of such compound improves a coating property, thus suppressing unevenness or coating liquid repellency:

The amount of the alignment-controlling agent at an air-interface in a coating liquid is desirably from 0.05 to 5 wt %. When the fluorine-base compound is used as an alignment-controlling agent at an air-interface, the amount of the compound in a coating liquid is desirably from not greater than 1 wt %.

The coating layer may comprise other additives such as plasticizers, surfactants or polymerizable monomers, with the liquid-crystal compound. Such additives may contribute to improvement in uniformity of a coating layer, strength of a coating layer, alignment ability of liquid-crystal molecules or the like. Such additives are desirably selected from materials which can be mixed with the liquid-crystal compound compatibly and don't inhibit the alignment of the liquid-crystal compound.

The polymerizable monomer may be selected from radical-polymerizable or cation-polymerizable compounds, and desirably selected from radical-polymerizable compounds having a plural function group, and among them, the compounds which can copolymerize with the polymerizable liquid-crystal compound described above are preferred. Preferred examples of the polymerizable monomer include those described in the columns of to [0020] in JPA No. 2002-296423. In usual, the amount of the polymerizable monomer is desirably from 1 to 50 wt %, and more desirably from 5 to 30 wt %, with respect to the total weight of a single or plural liquid crystal compounds.

The surfactant may be selected from any known surfactants, and is desirably selected from fluoride-surfactants. More specifically, the compounds, described in the columns of [0028] to [0056] in JPA No. 2001-330725, and the compounds, described in the columns of [0069] to [0126] in JPA No. 2003-295212, are preferred.

Single or plural polymers may be used with the liquid crystal. The polymer is desirably selected from polymers which can increase a viscosity of a coating liquid. Examples of the polymer include cellulose esters. Preferred examples of cellulose ester include those described in the column [0178] in JPA No. 2000-155216. Avoiding inhibiting the alignment of the liquid-crystal compound, the amount of the polymer is desirably from 0.1 to 10 wt %, and more desirably from 0.1 to 8 wt %, with respect to the weight of the liquid-crystal compound.

The retardation layer comprising fixed liquid-crystal molecules may be formed on a substrate. The substrate is desirably selected from transparent materials, and in particular, desirably has an optical transmittance of not smaller than 80%. The substrate is also desirably selected from materials having a small wavelength-dependence, and, in particular, preferably has a Re400/Re700 ratio of less than 1.2. Among such materials, polymer films are preferred. The substrate may function as the first or second retardation region or a protective film for a polarizing film. The substrate may function as a component of the first or second retardation region. The substrate is also preferably selected from materials having a small optical isotropy, and, in particular, preferably has an in-plane retardation (Re) of not greater than 20 nm, more preferably not greater than 10 nm and much more preferably not greater than 5 nm.

Examples of materials for the substrate, however not limited to them, include cellulose esters, polycarbonates, polysulfones, polyethersulfones, polyacrylates and polymethacrylates. Among these, cellulose esters are preferred, acetyl celluloses are more preferred and triacetyl celluloses are much more preferred. The polymer film is preferably prepared according to a solvent-casting method. The thickness of the substrate is desirably from 20 to 500 micrometers, and more preferably from 40 to 200 micrometers.

In order to improve adhesion between the substrate and a layer formed thereon (for example, an adhesion layer, a vertical alignment layer or a retardation layer), the polymer film may be subjected to surface treatment. Examples of surface treatments include corona discharge treatment, glow discharge treatment, flame treatment, acid treatment, alkali treatment and UV irradiation treatment. An adhesion layer (an undercoating layer) may be formed on the substrate. Also, for the purposes of imparting slipperiness in the traveling step and preventing sticking between the back face and the surface after winding up, for the protective film or longitudinal protective film, it is preferred to use one produced by coating a polymer layer having mixed therewith an inorganic particle having a mean particle size of from about 10 to 100 nm in a weight ratio of solids of from 5% to 40% on one side of a support or one produced by co-casting along with a support.

[Protective Film for Polarizing Film]

The liquid crystal display device of the invention may comprise a protective film capable of protecting the polarizing film. The protective film is preferably one which does not have absorption in the visible light region, has a light transmittance of 80% or more, and has a small retardation based on birefringence. Specifically, the in-plane Re is preferably from 0 to 30 nm, more preferably from 0 to 15 nm, and most preferably from 0 to 5 nm. Also, in an embodiment in which the first retardation region is disposed more closely to the liquid crystal cell as compared with the second retardation region, for example, the embodiment as illustrated in FIG. 2, the Rth of the protective film to be disposed in the liquid crystal cell side (for example, 7b and 19a in FIG. 2) is preferably not more than 40 nm, more preferably from 40 nm to −100 nm, further preferably from 40 nm to −50 nm, and most preferably from 20 nm to −20 nm. Also, in an embodiment in which the second retardation region is disposed more closely to the liquid crystal cell as compared with the first retardation region, for example, the embodiment as illustrated in FIG. 3, the Rth of the protective film to be disposed in the liquid crystal cell side (for example, 7b and 19a in FIG. 3) is preferably not more than 40 nm, more preferably from 40 nm to −50 nm, and further preferably from 20 nm to −20 nm. The optical characteristics of the other protective film (for example, 7a and 19b in FIG. 2 and FIG. 3) are not particularly limited.

Also, the thickness of the protective film, especially the thickness of the protective film to be disposed in the liquid crystal cell side, is preferably not more than 60 μm, more preferably not more than 50 μm, and further preferably not more than 40 μm from the viewpoint of making the Rth small. However, for the purpose of meeting the foregoing optical characteristics, in the case where the protective film is made of a plural number of layers, a preferred range of the thickness is not limited to this range.

As the protective film, though any film can be suitably used so far as it is satisfied with the foregoing characteristics, it is more preferable that the film includes a cellulose acylate or norbornene based film from the viewpoint of durability of the polarizing film.

The norbornene based polymer is a polymer of a monomer containing, as a major ingredient, a norbornene based monomer such as norbornene and derivatives thereof, tetracyclododecene and derivatives thereof, dicyclopentadiene and derivatives thereof, methanotetrahydrofluorene and derivatives thereof; and examples thereof include ring-opening polymers of a norbornene based monomer, ring-opening copolymers of a norbornene based monomer and other monomer ring-opening copolymerizable therewith, addition polymers of a norbornene based monomer, addition copolymers of a norbornene based monomer and other monomer copolymerizable therewith, and hydrogenated products thereof. Of these, hydrogenated products of a ring-opening polymer of a norbornene based monomer are the most preferable from the viewpoints of heat resistance and mechanical strength and the like. The molecular weight of the norbornene based polymer, the polymer of a monocyclic olefin, or the polymer of a cyclic conjugated diene is chosen depending upon the use purpose. However, when the molecular weight is usually in the range of from 5,000 to 500,000, preferably from 8,000 to 200,000, and more preferably from 10,000 to 100,000 in terms of a weight average molecular weight as reduced into polyisoprene or polystyrene as measured by the gel permeation chromatography of cyclohexane solution (or toluene solution when the polymer does not dissolve in cyclohexane), the mechanical strength and molding processability of the film are highly balanced, and therefore, such is suitable.

The cellulose acylate is not particularly limited whatever the acyl group is an aliphatic group or an aryl group. Examples thereof include alkylcarbonyl esters, alkenylcarbonyl esters or aromatic carbonyl esters and aromatic alkylcarbonyl esters of cellulose; these esters may further have a substituted group, with an ester group having not more than 22 carbon atoms in total being preferred. Examples of preferred cellulose acylate include cellulose acylates with an acyl group, having not more than 22 carbon atoms in total, such as acetyl, propionyl, butyroyl, valeryl, heptanoyl, octanoyl, decanoyl, dodecanoyl, tridecanoyl, hexadecanoyl, and octadecanoyl; with an allylcarbonyl group such as acryl and methacryl; with an arylcarbonyl group such as benzoyl and naphthaloyl; and with a cinnamoyl group, in the ester moiety thereof. Of these, cellulose acetate, cellulose acetate propionate, cellulose acetate butyrate, cellulose acetate stearate, and cellulose acetate benzoate are preferable. When a mixed ester is used, though its ratio is not particularly limited, it is preferable that the acetate accounts for 30% by mole or more in the total ester.

Of these, cellulose acylates are preferable, and ones of a photographic grade are especially preferable. Cellulose acrylates of a photographic grade are commercially available while satisfying grades such as viscosity average polymerization degree and degree of substitution. Examples of manufacturers of cellulose triacetate of a photographic grade include Daicel Chemical Industries, Ltd. (for example, LT-20, 30, 40, 50, 70, 35, 55 and 105), Eastman Kodak Company (for example, CAB-551-0.01, CAB-551-0.02, CAB-500-5, CAB-381-0.5, CAB-381-02, CAB-381-20, CAB-321-0.2, CAP-504-0.2, CAP-482-20, and CA-398-3), Courtaulds Fibers Limited, and Hoechst AG, and all of cellulose acylates of a photographic grade can be used. Also, for the purpose of controlling the mechanical characteristics and optical characteristics of the film, a plasticizer (the preferred additional amount is 0.1 to 20 wt % with respect to the weight of cellulose ester, the same goes for hereinafter), a modifying agent (0.1 to 20 wt %), a UV absorber (0.01 to 5 wt %), fine particles having a mean particle diameter of 5 to 3000 nm (0.001 to 5 wt %), a fluorine-based surfactant (0.001 to 2 wt %), a peeling agent (0.0001 to 2 wt %), a anti-degradation agent (0.0001 to 2 wt %), an agent for controlling an optical anisotropy (0.1 to 15 wt %), an IR absorber (0.1 to 5 wt %) and the like can be mixed (reference documents: JPA No. 2002-277632, JPA No. 2002-182215, on pages 16 to 22 in Kohkai Giho No. 2001-1745, published by Japan Institute of Invention and Innovation in Mar. 15, 2001).

As a method for molding the transparent polymer into a sheet or film, for example, all of a hot melt molding method and a solvent casting method can be employed. More specifically, the hot melt molding method can be classified into an extrusion molding method, a press molding method, an inflation molding method, an injection molding method, a blow molding method, and a stretching molding method. Of these methods, for the purpose of obtaining a film which is excellent in mechanical strength, surface precision, and the like, an extrusion molding method, an inflation molding method, and a press molding method are preferable; and an extrusion molding method is the most preferable. The molding condition is properly chosen depending upon the use purpose and the molding method. In the case according to the hot melt molding method, the cylinder temperature is properly set up preferably at from 100 to 400° C., and more preferably at from 150 to 350° C. The thickness of the foregoing sheet or film is preferably from 10 to 300 μm, and more preferably from 30 to 200 μm.

Stretching of the foregoing sheet or film is preferably performed in at least one direction in a stretching ratio of from 1.01 to 2 times at a temperature in the range of preferably from (Tg−30° C.) to (Tg+60° C.), and more preferably from (Tg−10° C.) to (Tg+50° C.) wherein Tg represents a glass transition temperature of the subject transparent polymer. The stretching direction may be at least one direction. In the case where the sheet is one obtained by extrusion molding, its direction is preferably the mechanical flow direction (extrusion direction) of the polymer. As the stretching method, a free contraction uniaxial stretching method, a width-fixed uniaxial stretching method, and a biaxial stretching method are preferable. Control of the optical characteristics can be performed by controlling this stretching ratio and heating temperature.

For the method and the equipment for producing the cellulose acylate film, herein employable are the solvent-casting method and the solvent-casting equipment heretofore generally used in the art. A dope (polymer solution) prepared in a dissolver (tank), is once stored in a storage tank, in which the dope is defoamed and is thus finally prepared. the temperature of the dope kept at a certain temperature for example 30° C., the dope is taken out and fed into a pressure die via a metering pressure gear pump capable of feeding it with accuracy, for example, based on the revolution number thereof, and then the dope is uniformly cast onto the endlessly-running cast member of a metal support via the slit of the pressure die, and at a peel point to which the metal support makes nearly one revolution, the still wet dope film (this may be referred to as a web) is peeled from the metal support. In the casting step, two or more kinds of dope may be cast at the same time or may be co-cast.

The ambient temperature in the casting step is preferably set within the range from −50 to 50° C., more preferably from −30 to 40° C. and much more preferably from −20 to 30° C. If the cellulose acylate solution is flow cast onto a support member at a low temperature, the solution is cooled on the support member rapidly and the gel strength thereof can be improved. And, thus, the film containing a lot of amount of organic solvent can be obtained and be peeled off from the support member in a short time without vaporizing organic solvent. The atmosphere surrounding the flow-casting system can be cooled with an air or nitrogen, argon or helium gas. Flow casting may be carried out at a relative humidity of 0 to 70% and preferably at 0 to 50%. The temperature of a support member (flow casting member), onto which the cellulose acylate solution is cast, is preferably set within the range from −50 to 130° C., more preferably from −30 to 25° C. and much more preferably from −20 to 15° C. In order to cool the flow-casting member, cooled air may be brought in the flow-casting member. The flow-casting member may be cooled with a cooling apparatus disposed at the flow-casting member. It is important to avoid dew condensation on the flow-casting member in a cooling step. Using a gas, dried gas is preferably used for cooling.

Next, while both ends of the thus-obtained web are clipped to ensure its width, the web is conveyed with a tenter and dried, and then further conveyed with rolls into a drier in which the web is completely dried, and thereafter this is wound up around a winder to predetermined width. The combination of the tenter and the drier with rolls may vary depending on the object of the film to be produced.

The residual solvent content of the dried film is preferably within the range from 0 to 5 wt %, more preferably from 0 to 2 wt % and much more preferably from 0 to 1 wt %. After dried, the film may be rolled up while being trimmed away the edges thereof. The preferred width is from 0.5 to 5 m, the more preferred width is from 0.7 to 3 m, and the much more preferred width is from 1 to 2 m. The preferred rolled length is from 300 to 30000 m, the more preferred length is from 500 to 10000 m, and the much more preferred length is from 1000 to 7000 m.

In order to set the Re or Rth of the film within the preferred range, stretching may be carried out. Stretching may be carried out at any stage before drying step (for example, at a stage after peeling off the film from the support member before completing drying) or at any stage after drying step. The stretching step may be performed without an interval (on-line) after the film-forming step, or may be performed with any interval (off-line) after the film forming step and the rolling up step.

Stretching is preferably performed at a temperature in the range of preferably from Tg ° C. to (Tg+50° C.), more preferably from (Tg+1° C.) to (Tg+30° C.) and much more preferably from (Tg+2° C.) to (Tg+20° C.). The stretching degree is desirably within the range from 1% to 500%, more preferably from 3% to 400%, and much more preferably from 5% to 300%. Stretching may be performed as one step or multi steps.

Such stretching may be carried out with two or more pairs of nip rolls in a long direction (lengthwise stretching) or with clips grasping both edges of the film in an orthogonal direction to the long direction (widthwise stretching). Generally, according to the stretching methods, as the stretching degree is larger, the film exhibiting a larger Rth can be obtained. The film exhibiting a larger Re can be obtained by setting a larger difference between stretching degrees in lengthwise stretching and in widthwise stretching.

As a method for making the Rth of the cellulose acylate film small, it is effective to mix the film with a compound having a non-planar structure. Also, methods as described in JPA No. hei 11-246704, JPA No. 2001-247717, and Japanese Patent Application No. 2003-379975 are enumerated. Also, the Rth can be made small by making the thickness of the cellulose acylate film small.

The film having a negative Rth may be produced by addition an agent capable of lowering Rth or by use of cellulose acylate having a substitution degree of not less than 2.87.

The agent capable of lowering Rth may be selected from compounds which can disorder the orientation of cellulose acylate molecules and don't tend to be oriented themselves and/or have a low polarizability anisotropy; and is preferably selected from compounds having both of a polar group and a non-polar group for disordering the orientation of cellulose acylate molecules. And for disordering the orientation of cellulose acylate molecules or lowering polarizability anisotropy, the agent is preferably selected from flexible compounds such as liquid crystal compounds, and if the compounds have plural aromatic rings, it is preferred that the rings are not located in a same plane. The amount of the agent capable of lowering Rth is preferably from 0.1 to 30 wt %, more preferably from 1 to 25 wt % and much more preferably from 5 to 20 wt % with respect to the weight of cellulose acylate.

According to the method of using cellulose acylate having a substitution degree of not less than 2.87, a preferred film may be obtained by flow casting a dope, prepared by dissolving cellulose acylate in halogenated hydrogen carbon or a mixed solvent of halogenated hydrocarbon and alcohol under cooling, in the same manner as described above. The substitution degree is preferably not less than 2.87, more preferably from 2.87 to 2.96, much more preferably from 2.88 to 2.95 and most preferably from 2.90 to 2.95.

Preferred examples of the solvent used for preparation of the dope include dichloromethane, methylformate, ethylformate, methylacetate, acetone, methyl lethyl ketone, cyclopentanone, cyclohexanone, methanol, ethanol, 1-propanol, 2-propanole, 1-butanole, 2-butanole, cyclohexanol, methylacetoacetate, hexane and cyclohexane. From the point of solubility of cellulose ester, the solvent preferably contains alcohol in an amount of 10 to 30 wt %, more preferably of 11 to 30 wt %, and much more preferably of 12 to 25 wt % with respect to the total weight of the solvent.

From the point of lowering Rth, an organic solvent poor for cellulose acylate, having a boiling point of not lower than 95° C., which doesn't tend to vaporize with halogenated hydrocarbon at an early stage in drying step and tends to be condensed gradually, is desirably contained in the solvent in an amount of 1 to 10 wt %, more preferably of 1.5 to 8 wt % and much more preferably of 2 to 6 wt % with respect to the total weight of the solvent. From the point of lowering load of peeling from a band and lowering Rth, such a poor organic solvent having a boiling point of not lower than 95° C. is preferably selected from alcohols; and from the point of reducing difficulty for drying and improving productivity, two or more kinds of alcohol, one of which has a boiling point of not lower than 95° C., and another of which has a boiling point of lower than 95° C., are preferably used.

The cellulose acylate solution is preferably prepared according to a cooling dissolving method, and may be prepared according to a combination of a cooling dissolving method and a high-temperature dissolving method. The method for preparing the cellulose acylate solution is described particularly in JPA No. syo 58-127737, JPA No. syo 61-106628, JPA No. hei 2-276830, JPA No, hei 4-259511, JPA No. hei 5-163301, JPA No. hei 9-95544, JPA No. hei 10-45950, JPA No. hei 10-95854, JPA No. hei 11-71463, JPA No. hei 11-302388, JPA No. hei 11-322946, JPA No. hei 11-322947, JPA No. hei 11-323017. JPA No. 2000-53784, JPA No. 2000-273184, JPA No. 2000-273239 and the like.

The protective film for the polarizing film having such optical characteristics that the Rth is negative can be easily produced by stretching the polymer film in the thickness direction of the film (for example, JPA No. 2000-162436) or a method for coating a vinyl carbazole based polymer and drying (for example, JPA No. 2001-091746). Also, the protective film may contain a liquid crystal material and for example, may be a retardation layer formed of a composition comprising a liquid crystalline compound having such optical characteristics that the Rth is negative. Examples of the subject retardation layer include a layer produced by aligning a cholesteric discotic liquid crystal compound containing a chiral structural unit or a composition thereof such that its spiral axis is substantially vertical to the substrate and then fixing it and a layer produced by aligning a rod-like liquid crystal compound having a positive refractive index anisotropy or a composition thereof substantially vertically to the substrate and then fixing it (for example, see JPA No. hei 6-331826 and Japanese Patent No. 2,853,064). The rod-like liquid crystal compound may be a low molecular compound or a high molecular compound. Further, the protective film having such optical characteristics that the Rth is negative can be constructed by laminating a plural number of retardation layers in addition to one sheet of the retardation layer. Also, the protective film can be constructed such that the whole of a laminate of the support and the retardation layer meets the foregoing optical characteristics. As the rod-like liquid crystal compound to be used, ones taking the state of a nematic liquid crystal phase, a smectic liquid crystal phase, or a lyotropic liquid crystal phase in the temperature range at which alignment and fixing are performed are suitably used. Liquid crystals exhibiting smectic A phase and B phase, from which uniform vertical alignment free from fluctuation is obtained, are preferable. In particular, with respect to the rod-like liquid crystalline compound which becomes in the foregoing liquid crystal state in a proper alignment temperature range in the presence of additives, it is also preferred to form the layer by using a composition containing the subject additives and the rod-like liquid crystalline compound.

For the purpose of improving the adhesion between the protective film and a layer to be provided thereon (an adhesive layer, a passivation layer, an alignment layer, a retardation layer, an antireflection layer, a hard coat layer, an antistatic layer or an anti-glare layer), the filmmay be subjected to a surface treatment such as a glow discharge treatment, a corona discharge treatment, an ultraviolet light (UV) treatment, a flame treatment or a saponification treatment (an acid saponification treatment or an alkali saponification treatment). And a glow discharge treatment and an alkali saponification treatment are preferred. With or without such surface treatment, an undercoat layer (an adhesive layer) may be formed. The under coat is particularly described on page 32 in Kokai Giho No. 2001-1745 published in Mar. 5, 2001, by of Japan Institute of Invention and Innovation. Also, for the purposes of imparting slipperiness in the traveling step and preventing sticking between the back face and the surface after winding up, for the protective film or longitudinal protective film, it is preferred to use one produced by coating a polymer layer having mixed therewith an inorganic particle having a mean particle size of from about 10 to 100 nm in a weight ratio of solids of from 5% to 40% on one side of a support or one produced by co-casting along with a support. Various functional layers to be formed on a cellulose acylate film is particularly described on pages 32 to 45 in Kokai Giho No. 2001-1745 published in Mar. 5, 2001, by of Japan Institute of Invention and Innovation, and those can be applied to the present invention.

EXAMPLE

The following paragraphs will further detail the present invention referring to specific examples. It is to be noted that any materials, reagents, amount or ratio of use, operations and so forth can properly be altered without departing from the spirit of the present invention. Therefore the scope of the present invention is by no means limited to the specific examples described below.

<Preparation of IPS Mode Liquid Crystal Cell No. 1>

As illustrated in FIG. 1, electrodes (2 and 3 in FIG. 1) were disposed at an interval between the adjacent electrodes of 20 μm on one sheet of glass substrate, and a polyimide film was provided as an alignment film thereon and subjected to a rubbing treatment. The rubbing treatment was performed in the direction 4 as shown in FIG. 1. A polyimide film was provided on one surface of one sheet of glass substrate as separately prepared and subjected to a rubbing treatment, thereby forming an alignment film. The two sheets of glass substrates were superimposed and stuck on each other in such a manner that the alignment films were opposed to each other, a gap (d) between the substrates was adjusted at 3.9 μm, and the rubbing directions of the two sheets of glass substrates were made parallel. Next, a nematic liquid crystal composition having a refractive index anisotropy (Δn) of 0.0769 and a positive dielectric anisotropy (Δε) of 4.5 was enclosed therein. The liquid crystal layer had a value of d·Δn of 300 nm.

<Preparation of First Retardation Region Nos. 1 to 4>

A polycarbonate pellet was dissolved in methylene chloride, flow-cast on a metal band and dried to form a polycarbonate film having a thickness of 80 μm. The obtained polycarbonate film was uniaxially stretched in the longitudinal direction with a stretching degree of 3.5%, 4.5% and 5.5% respectively, to form First retardation region No. 1, No. 2 and No. 3. Besides, the obtained polycarbonate film having a thickness of 80 μm was biaxially stretched in the longitudinal direction with a stretching degree of 3.5% and in a width direction with a stretching degree of 1%, to form First retardation region No. 4.

The dependence on light incident angle of Re was measured using an automatic birefringence analyzer (KOBRA-21ADH, manufactured by Oji Scientific Instruments), and their optical characteristics were calculated. As a result, it could be confirmed that the first retardation region No. 1 had an Re of 100 nm, an Rth of 50 nm and an Nz of 1.0; the first retardation region No. 2 had an Re of 140 nm, an Rth of 70 nm and an Nz of 1.0; the first retardation region No. 3 had an Re of 80 nm, an Rth of 80 nm and an Nz of 1.5, and the first retardation region No. 4 had an Re of 170 nm, an Rth of 85 nm and an Nz of 1.0, respectively.

<Preparation of Second Retardation Region Nos. 1 to 4>

To a surface of a commercially available cellulose acetate film (FUJITAC TD80UF, manufactured by Fuji Photo Film Co., Ltd., Re=2 nm, Rth=48 nm), and to the surfaces of the first retardation region Nos. 3 and 4, which were subjected to a corona discharge treatment, commercially available vertical alignment film (JALS-204R, manufactured by JSR Corporation) having been diluted with methyl ethyl ketone (1:1) was applied at 2.4 mL/m² using a wire bar coater respectively. Immediately thereafter, the resulting films were respectively dried with warm air at 120° C. for 120 seconds, to form an alignment layer on each of them.

On the alignment film, a solution of 3.8 g of the following rod-like liquid crystal compound, 0.06 g of a photo polymerization initiator (IRGACURE 907, manufactured by Ciba-Geigy AG), 0.02 g of a sensitizer (KAYACURE DETX, manufactured by Nippon Kayaku Co., Ltd.), and 0.002 g of the following agent for vertical alignment at an air-interface dissolved in 9.2 g of methyl ethyl ketone was coated by a wire bar shown in a following table. The resulting alignment film was stuck onto a metallic frame and heated in a thermostat at 100° C. for 2 minutes, thereby aligning the rod-like liquid crystal compound. Next, the rod-like liquid crystal compound was crosslinked upon UV irradiation for 20 seconds using a high mercury vapor pressure lamp of 120 W/cm at 80° C., followed by standing for cooling to room temperature. There were thus prepared retardation layers shown in the following table.

Rod-like liquid crystal compound

Agent for vertical alignment at an air interface (described in the specification of Japanese patent application No. 2003-119959 as Compound (II-4)

TABLE 1

| Film No. | Retardation layer of rod like LC (Second retardation region No.) | Substrate | Wire bar No. |
|---|---|---|---|
| "a" | Second retardation region No. 1 | TD8OUF | #1.5 |
| "b" | Second retardation region No. 2 | TD8OUF | #2.0 |
| "c" | Second retardation region No. 3 | Firs retardation region No. 3 | #3.0 |

TABLE 1-continued

| Film No. | Retardation layer of rod like LC (Second retardation region No.) | Substrate | Wire bar No. |
|---|---|---|---|
| "d" | Second retardation region No. 4 | First retardation region No. 4 | #2.7 |

Structure at top of table:
HO₃S—[benzene ring with O(CH₂)₃C₈F₁₇ substituents]—O(CH₂)₃C₈F₁₇

Optical characteristics of the second retardation regions only were respectively obtained by measuring a dependence of Re on the light incident angle of the films, by an automatic birefringence meter (KOBRA-21ADH, manufactured by Oji Scientific Instruments), and subtracting contributions (Re=5 nm) of the substrates measured in advance. As a result, it could be confirmed that the second retardation region No. 1 had an Re of 0 nm and an Rth of −75 nm; the second retardation region No. 2 had an Re of 0 nm and an Rth of −100 nm; the second retardation region No. 3 had an Re of 0 nm and an Rth of −150 nm; and the second retardation region No. 4 had an Re of 0 nm and an Rth of −135 nm, respectively. It was also confirmed that rod-like liquid crystal were aligned substantially vertically in all of the layers.

<Preparation of Protective Film No. 1>

In a mixing tank, the following ingredients were charged and stirred under heating to dissolve the respective ingredients therein, thereby preparing a cellulose acetate solution A.

| <Formulation of cellulose acetate solution A> | |
|---|---|
| Cellulose acetate having a degree of substitution of 2.86 | 100 parts by weight |
| Triphenyl phosphate (plasticizer) | 7.8 parts by weight |
| Biphenyldiphenyl phosphate (plasticizer) | 3.9 parts by weight |
| Methylene chloride (first solvent) | 300 parts by weight |
| Methanol (second solvent) | 54 parts by weight |
| 1-Butanol | 11 parts by weight |

In another mixing tank, the following ingredients were charged and stirred under heating to dissolve the respective ingredients therein, thereby preparing an additive solution B-1.

| <Formulation of additive soultion B-1> | |
|---|---|
| Methylene chloride | 80 parts by weight |
| Methanol | 20 parts by weight |
| Optical anisotropy reducing agent having the following formula | 40 parts by weight |

To 477 parts by weight of the cellulose acetate solution A, 40 parts by weight of the additive solution B-1 was added, and the mixture was thoroughly stirred, thereby preparing a dope. The dope was cast on a drum as cooled at 0° C. from a casting nozzle. The film was peeled apart in the state that the solvent content was 70% by weight, the both ends of the film in the width direction were each fixed by a pin tenter (pin tenter as described in FIG. 3 of JPA No. hei 4-1009), and the film was dried while keeping a gap such that the stretching ratio in the transverse direction (vertical direction to the machine direction) was 3% in the state having a solvent content of from 3 to 5% by weight. Thereafter, the film was further dried by traveling between rolls of a thermal treatment unit, thereby preparing a polarizing plate protective film No. 1 having a thickness of 80 μm.

The dependence on light incident angle of Re was measured using an automatic birefringence analyzer (KOBRA-21ADH, manufactured by Oji Scientific Instruments), and its optical characteristics were calculated. As a result, it could be confirmed that the polarizing plate protective film No. 1 had an Re of 1 nm and an Rth of 6 nm.

<Preparation of Polarizing Plate A>

Next, iodine was adsorbed on a stretched polyvinyl alcohol film to prepare a polarizing film. A commercially available cellulose acetate film (FUJITAC TD80UF, manufactured by Fuji Photo Film Co., Ltd., Re=2 nm, Rth=48 nm) was subjected to a saponification treatment and stuck onto one surface of the polarizing film using a polyvinyl alcohol based adhesive. Further, a commercially available cellulose acetate film (FUJITAC T40UZ, manufactured by Fuji Photo Film Co., Ltd., Re=1 nm, Rth=35 nm and its thickness was 40 μm) was subjected to a saponification treatment and stuck onto another surface of the polarizing film using a polyvinyl alcohol based adhesive, thereby preparing Polarizing plate A.

<Preparation of Polarizing Plate B>

A polarizing film was prepared in the same manner, and a commercially available cellulose acetate film (FUJITAC TD80UF, manufactured by Fuji Photo Film Co., Ltd.) was subjected to a saponification treatment and stuck onto one surface of the polarizing film using a polyvinyl alcohol based adhesive. Further, the protective film No. 1 as prepared previously was stuck on the other side of the polarizing film in the same manner, thereby preparing Polarizing plate B.

<Preparation of Polarizing Plate C>

A polarizing film was prepared in the same manner, and a commercially available cellulose acetate film (FUJITAC TD80UF, manufactured by Fuji Photo Film Co., Ltd.) was subjected to a saponification treatment and stuck onto both surfaces of the polarizing film using a polyvinyl alcohol based adhesive, thereby preparing Polarizing plate C.

Example 1

The first retardation region No. 1 as prepared previously was stuck on the side of the polarizing plate protective film T40UZ of the polarizing plate A using an acrylic adhesive in such a manner that the transmission axis of the polarizing film and the slow axis of the first retardation region No. 1 were parallel to each other. Further, the second retardation region No. 1 of the film "a" prepared previously was stuck thereonto using an acrylic adhesive. After that, the substrate of the film "a", or in other words TD80UF, was removed.

This laminate was stuck on one side of the IPS mode liquid crystal cell No. 1 as prepared previously in such a manner that the transmission axis of the polarizing plate was parallel to the rubbing direction of the liquid crystal cell (that is, the slow axis of the first retardation region No. 1 was parallel to the slow axis of the liquid crystal molecule of the liquid crystal cell in a black state) and that the side of the second retardation region No. 1 was faced at the liquid crystal cell side.

Subsequently, the polarizing plate A was stuck on the other side of this IPS mode liquid crystal cell No. 1 in such a manner that the FUJITAC T40UZ side was faced at the liquid crystal cell side and that it was made in the crossed Nichol disposal to the polarizing plate A, thereby preparing a liquid crystal display device. The thus prepared liquid crystal display device was measured for leaked light. The liquid crystal cell No. 1 without the polarizing plates was placed on a schaukasten in a dark room, and brightness, "brightness 1", of the cell in a black state was measured with a brightness photometer which was placed 1 meter far from the cell in a 45° anticlockwise direction with respect to the rubbing direction of the cell and in a 60° oblique direction with respect to a normal line of the cell.

After that, the liquid crystal cell No. 1 with the polarizing plates was placed on a schaukasten in a dark room, brightness, "brightness 2", of the cell in a black state was measured in the same manner as the above. And a percentage of the brightness 2 to the brightness 1 was defined as leaked light. The calculated leaked light was 0.10%.

Example 2

The first retardation region No. 2 as prepared previously was stuck on the side of the protective film No. 1 of the polarizing plate B using an acrylic adhesive in such a manner that the transmission axis of the polarizing film and the slow axis of the first retardation region 2 were parallel to each other. Further, the second retardation region No. 2 of the film "b" prepared previously was stuck thereonto using an acrylic adhesive. After that, the substrate of the film "b", or in other words TD80UF, was removed.

This laminate was stuck on one side of the IPS mode liquid crystal cell No. 1 as prepared previously in such a manner that the transmission axis of the polarizing plate was parallel to the rubbing direction of the liquid crystal cell (that is, the slow axis of the first retardation region No. 2 was parallel to the slow axis of the liquid crystal molecule of the liquid crystal cell in a black state) and that the side of the second retardation region No. 2 was faced at the liquid crystal cell side. Subsequently, the polarizing plate B was stuck on the other side of this IPS mode liquid crystal cell No. 1 in such a manner that the protective film No. 1 side was faced at the liquid crystal cell side and that it was made in the crossed Nichol disposal to the polarizing plate B, thereby preparing a liquid crystal display device. The thus prepared liquid crystal display device was measured for leaked light in the same manner as the above. The leaked light was 0.05%.

Example 3

The film "c" as prepared previously was stuck on the polarizing plate C using an acrylic adhesive in such a manner that the transmission axis of the polarizing film and the slow axis of the first retardation region No. 3 were parallel to each other and that the side of the first retardation region No. 3 was faced at the polarizing film side.

This laminate was stuck on one side of the IPS mode liquid crystal cell No. 1 as prepared previously in such a manner that the transmission axis of the polarizing plate was parallel to the rubbing direction of the liquid crystal cell (that is, the slow axis of the first retardation region No. 3 was parallel to the slow axis of the liquid crystal molecule of the liquid crystal cell in a black state) and that the side of the second retardation region No. 3 was faced at the liquid crystal cell side.

Subsequently, the polarizing plate B was stuck on the other side of this IPS mode liquid crystal cell No. 1 in such a manner that the protective film No. 1 side was faced at the liquid crystal cell side and that it was made in the crossed Nichol disposal to the polarizing plate C, thereby preparing a liquid crystal display device. The thus prepared liquid crystal display device was measured for leaked light in the same manner as the above. The leaked light was 0.05%.

Example 4

The film "d" as prepared previously was stuck on the film T40UZ of the polarizing plate A using an acrylic adhesive in such a manner that the transmission axis of the polarizing film and the slow axis of the first retardation region No. 4 were orthogonal to each other and that the side of the second retardation region No. 4 was faced at the polarizing film side.

This laminate was stuck on one side of the IPS mode liquid crystal cell No. 1 as prepared previously in such a manner that the transmission axis of the polarizing plate was parallel to the rubbing direction of the liquid crystal cell (that is, the slow axis of the first retardation region No. 4 was parallel to the slow axis of the liquid crystal molecule of the liquid crystal cell in a black state) and that the side of the first retardation region No. 4 was faced at the liquid crystal cell side.

Subsequently, the polarizing plate A was stuck on the other side of this IPS mode liquid crystal cell No. 1 in such a manner that the film T40UZ side was faced at the liquid crystal cell side and that it was made in the crossed Nichol disposal to the polarizing plate A, thereby preparing a liquid crystal display device. The thus prepared liquid crystal display device was measured for leaked light in the same manner as the above. The leaked light was 0.11%.

Example 5

The film "b" as prepared previously was stuck on the protective film No. 1 of the polarizing plate B using an acrylic adhesive. After that, the substrate of the film "b", or in other words TD80UF, was removed. On the film "b", the first retardation region No. 2 was stuck using an acrylic adhesive in such a manner that the transmission axis of the polarizing film and the slow axis of the first retardation region No. 2 were orthogonal to each other.

This laminate was stuck on one side of the IPS mode liquid crystal cell No. 1 as prepared previously in such a manner that the transmission axis of the polarizing plate was parallel to the rubbing direction of the liquid crystal cell (that is, the slow axis of the first retardation region No. 2 was orthogonal to the slow axis of the liquid crystal molecule of the liquid crystal cell in a black state) and that the side of the first retardation region No. 2 was faced at the liquid crystal cell side.

Subsequently, the polarizing plate B was stuck on the other side of this IPS mode liquid crystal cell No. 1 in such a manner that the protective film No. 1 side was faced at the liquid crystal cell side and that it was made in the crossed Nichol disposal to the polarizing plate B, thereby preparing a liquid crystal display device. The thus prepared liquid crystal display device was measured for leaked light in the same manner as the above. The leaked light was 0.05%.

Example 6

Production of Ferroelectric Liquid-Crystal Cell No. 1

A polyimide film was formed on an electrode having an ITO electrode thereon, and was subjected to a rubbing treatment to form an alignment layer. Another electrode having an ITO was treated in the same manner. Two substrates were positioned with their alignment layers facing, with their rubbing directions being parallel to each other and with a 1.9 micrometer gap between them. Ferroelectric liquid-crystal composition, having a refractive-index anisotropy, $\Delta n$, of 0.15 and an intrinsic polarization, Ps, of 12 $nCcm^{-2}$, was poured into the gap between the substrates to form a liquid-crystal layer. The d·$\Delta n$ of the layer was 280 nm.

The first retardation region No. 2 as prepared previously was stuck on the side of the protective film No. 1 of the polarizing plate B using an acrylic adhesive in such a manner that the transmission axis of the polarizing film and the slow axis of the first retardation region 2 were parallel to each other. Further, the second retardation region No. 2 of the film "b" prepared previously was stuck thereonto using an acrylic adhesive. After that, the substrate of the film "b", or in other words TD80UF, was removed.

This lamination was stuck on the one side of the ferroelectric liquid-crystal cell No. 1 in such a manner that the slow axis of the first retardation region No. 2 was made parallel to the slow axis of liquid-crystal molecules in the cell while being applied 10 V direct-current voltage and that the side of the second retardation region No. 2 was faced at the liquid crystal cell side.

Subsequently, the polarizing plate B was stuck on the other side of this ferroelectric liquid-crystal cell No. 1 in such a manner that the protective film No. 1 side was faced at the liquid crystal cell side and that it was made in the crossed Nichol disposal to the polarizing plate B, thereby preparing a liquid crystal display device. The thus prepared liquid crystal display device was measured for leaked light in the same manner as the above. The leaked light was 0.05%.

Example 7

The film "b" as prepared previously was stuck on the side of the protective film No. 1 of the polarizing plate B using an acrylic adhesive. After that, the substrate of the film "b", or in other words TD80UF, was removed. On the film "b", the first retardation region No. 2 was stuck using an acrylic adhesive in such a manner that the transmission axis of the polarizing film and the slow axis of the first retardation region No. 2 were orthogonal to each other.

This lamination was stuck on the one side of the IPS mode liquid-crystal cell No. 1 in such a manner that the slow axis of the first retardation region No. 2 was made orthogonal to the slow axis of liquid-crystal molecules in the cell in a black state.

Subsequently, the polarizing plate C was stuck on the other side of this IPS mode cell No. 1 in such a manner that it was made in the crossed Nichol disposal to the polarizing plate B, thereby preparing a liquid crystal display device comprising the protective films for the polarizing film, having an Rth exceeding 40 nm. The thus prepared liquid crystal display device was measured for leaked light in the same manner as the above. The leaked light was 0.28%.

A liquid crystal display device was produced in the same manner as Example 7, except that the polarizing plate B and the polarizing plate C were exchanged each other. The thus prepared liquid crystal display device was measured for leaked light in the same manner as the above. The leaked light was 0.31%.

Compared these results with the result of Example 2, the liquid crystal display device of Example 2, in which both of the protective films disposed at the liquid crystal side had an Rth of not greater than 40 nm, generated smaller light leakage than that generated from the liquid crystal display device, in which one of the protective films disposed at the liquid crystal side had an Rth exceeding 40 nm.

Comparative Example 1

A commercially available polarizing plate (HLC2-5618, manufactured by Sanritz Corporation) was stuck on the both sides of the IPS mode liquid crystal cell 1 as prepared previously in the crossed Nichol disposal, thereby preparing a liquid crystal display device. The optical compensation film was not used. In the foregoing liquid crystal display device, the polarizing plates were stuck in the same manner as in Example 1 in such that the transmission axis of the upper polarizing plate was parallel to the rubbing direction of the liquid crystal cell. The thus prepared liquid crystal display device was measured for leaked light. The leaked light was 0.55%.

Comparative Example 2

The first retardation region No. 2 as prepared previously was stuck on the side of the protective film No. 1 of the polarizing plate B using an acrylic adhesive in such a manner that the transmission axis of the polarizing film and the slow axis of the first retardation region 2 were orthogonal to each other. Further, the second retardation region No. 2 of the film "b" prepared previously was stuck thereonto using an acrylic adhesive. After that, the substrate of the film "b", or in other words TD80UF, was removed.

This lamination was stuck on the one side of the IPS mode liquid-crystal cell No. 1 in such a manner that the transmission axis of the polarizing plate B was orthogonal to the rubbing direction of the liquid crystal cell (or in other words, the transmission axis of the polarizing plate B was made orthogonal to the slow axis of liquid-crystal molecules in the cell in a black state and the slow axis of the first retardation region No. 2 was made parallel to the slow axis of liquid-crystal molecules in the cell in a black state) and that the side of the first retardation region No. 2 was faced at the liquid crystal cell side.

Subsequently, the polarizing plate B was stuck on the other side of this IPS liquid-crystal cell No. 1 in such a manner that the protective film No. 1 side was faced at the liquid crystal cell side and that it was made in the crossed Nichol disposal to the polarizing plate B, thereby preparing a liquid crystal display device. The thus prepared liquid crystal display device was measured for leaked light in the same manner as the above. The leaked light was 1.59%.

The invention claimed is:

1. A liquid crystal display device comprising, at least, a first polarizing film, a first retardation region, a second retardation region, a liquid crystal cell comprising a liquid crystal layer and a pair of substrates sandwiching the liquid crystal layer with liquid crystal molecules of the liquid crystal layer being aligned in parallel to the surfaces of the pair of substrates in a black state, and a second polarizing film, wherein an in-plane retardation (Re) of the first retardation region is from 60 nm to 200 nm and a value of Nz of the first retardation region, as defined by [Nz=Rth/Re+0.5] where "Rth" is a retardation in the thickness direction of the first retardation region and "Re" is an in-plane retardation of the first retardation region, exceeds 0.8 and is not greater than 1.5;

an in-plane retardation (Re) of the second retardation region is not greater than 50 nm, any optical axis is not included in a plane of the second retardation region and a retardation (Rth) in the thickness direction of the second retardation region is from −200 nm to −50 nm; and the transmission axis of the first polarizing film is parallel to the slow axis direction of the liquid crystal molecules of the liquid crystal layer in a black state.

2. The liquid crystal display device of claim 1, comprising the first polarizing film, the first retardation region, the second retardation region and the liquid crystal cell in this order wherein a slow axis of the first retardation region is parallel to the transmission axis of the first polarizing film.

3. The liquid crystal display device of claim 1, comprising the first polarizing film, the second retardation region, the first retardation region and the liquid crystal cell int this order, wherein a slow axis of the first retardation region is orthogonal to the transmission axis of the first polarizing film.

4. The liquid crystal display device of claim 1, comprising a pair of protective films sandwiching at least either of the first polarizing film or the second polarizing film wherein at least one of the protective films, disposed in the near side to the liquid crystal layer, has a retardation Rth in the thickness direction of from 40 nm to −50 nm.

5. The liquid crystal display device of claim 1, comprising a pair of protective films sandwiching at least either of the first polarizing film or the second polarizing film wherein at least one of the protective films, disposed in the near side to the liquid crystal layer, has a retardation Rth in the thickness direction of from 20 nm to −20 nm.

6. The liquid crystal display device of claim 1, comprising a pair of protective films sandwiching at least either of the first polarizing film or the second polarizing film wherein at least one of the protective films, disposed in the near side to the liquid crystal layer, has a thickness of not more than 60 μm.

7. The liquid crystal display device of claim 1, comprising a pair of protective films sandwiching at least either of the first polarizing film or the second polarizing film wherein at least one of the protective films, disposed in the near side to the liquid crystal layer, comprises a cellulose acylate film or a norbornene based film.

8. The liquid crystal display device of claim 1, comprising a pair of protective films sandwiching at least either of the first polarizing film or the second polarizing film wherein at least one of the protective films, disposed in the near side to the liquid crystal layer, comprises cellulose acylate having a substitution degree with a acyl group of not smaller than 2.87.

9. The liquid crystal display device of claim 1, wherein the first retardation region and the second retardation region are disposed in the position closer to the substrate in the opposite side to the view side of the pair of substrates of the liquid crystal cell.

* * * * *